N. H. ANDERSON.
TAPPING MACHINE.
APPLICATION FILED JUNE 18, 1915.

1,172,336. Patented Feb. 22, 1916.

2 SHEETS—SHEET 1.

Witnesses
Ivan L. Morehouse
Elbert O. Hull

Inventor
Nils H. Anderson
By Chamberlain & Newman
Attorneys

THE COLUMBIA PLANOGRAPH CO., WASHINGTON, D. C.

N. H. ANDERSON.

TAPPING MACHINE.

APPLICATION FILED JUNE 18, 1915.

1,172,336. Patented Feb. 22, 1916.

2 SHEETS—SHEET 2.

Witnesses

Ivan L. Morehouse.

Elbert O. Hull.

Inventor

Nils H. Anderson

Chamberlain & Newman his Attorneys

THE COLUMBIA PLANOGRAPH CO., WASHINGTON, D. C.

UNITED STATES PATENT OFFICE.

NILS H. ANDERSON, OF EAST HAMPTON, CONNECTICUT, ASSIGNOR TO FENN MANUFACTURING CO., OF HARTFORD, CONNECTICUT, A COPARTNERSHIP CONSISTING OF WILSON L. FENN AND WILSON A. FENN.

TAPPING-MACHINE.

1,172,336. Specification of Letters Patent. Patented Feb. 22, 1916.

Application filed June 18, 1915. Serial No. 34,841.

*To all whom it may concern:*

Be it known that I, NILS H. ANDERSON, a citizen of the United States, and resident of East Hampton, in the county of Middlesex and State of Connecticut, have invented certain new and useful Improvements in Tapping-Machines, of which the following is a specification.

This invention relates to new and useful improvements in tapping machines such as are employed for tapping nuts and other small parts.

The object of the invention is to produce an improved form of friction driven tapping machine wherein the spindle normally stands idle, but is engaged and rotated for running the tap into the work by an upward pressure of the work against the spindle; the machine is further constructed and arranged so that a reverse movement of the spindle is obtained by simply drawing or pulling the work down and off from the tap; and finally to produce a simple, durable and effective form of tapping machine which can be built and sold at a low cost.

Another object of the device is to arrange the various elements so that when the feeding of the work ceases the spindle will be pulled downward: consequently arresting the movement of the spindle in a clockwise direction. By lowering the piece upon which the tapping operation is performed the spindle will be caused to rotate in a counter clockwise direction. It will also be understood that by this arrangement it will be possible to arrest the vertical position of the spindle in either its extreme upward or in its extreme downward position, which would in the first case, make it possible to use this machine for ordinary drilling, and in the latter case the machine could be used for disassembling or extracting screws from any small part which must be disassembled.

Upon the accompanying two sheets of drawings forming a part of this specification similar characters of reference will be found to designate like or corresponding parts throughout the several figures and of which—

Figure 1:
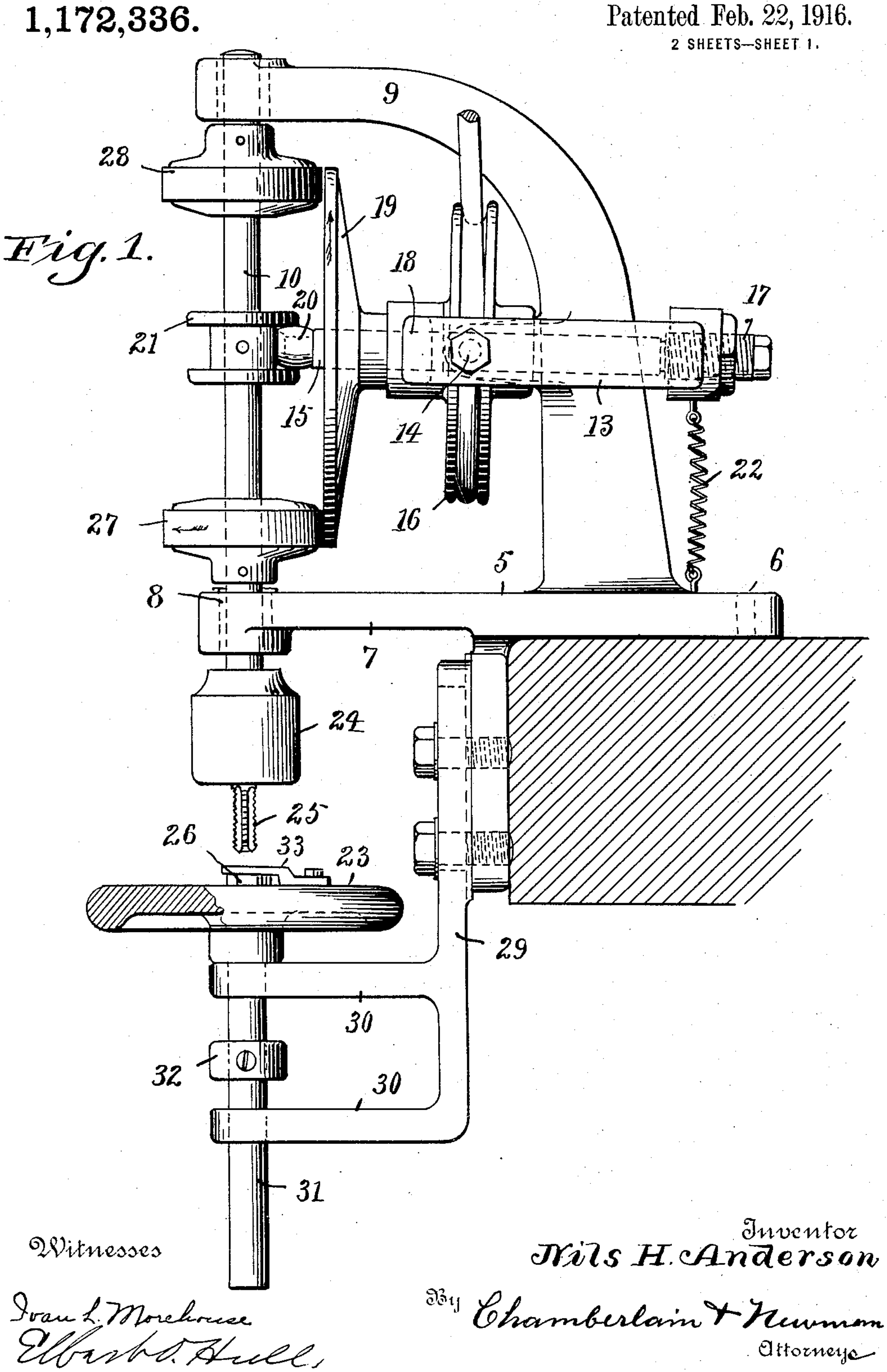
Figure 2:
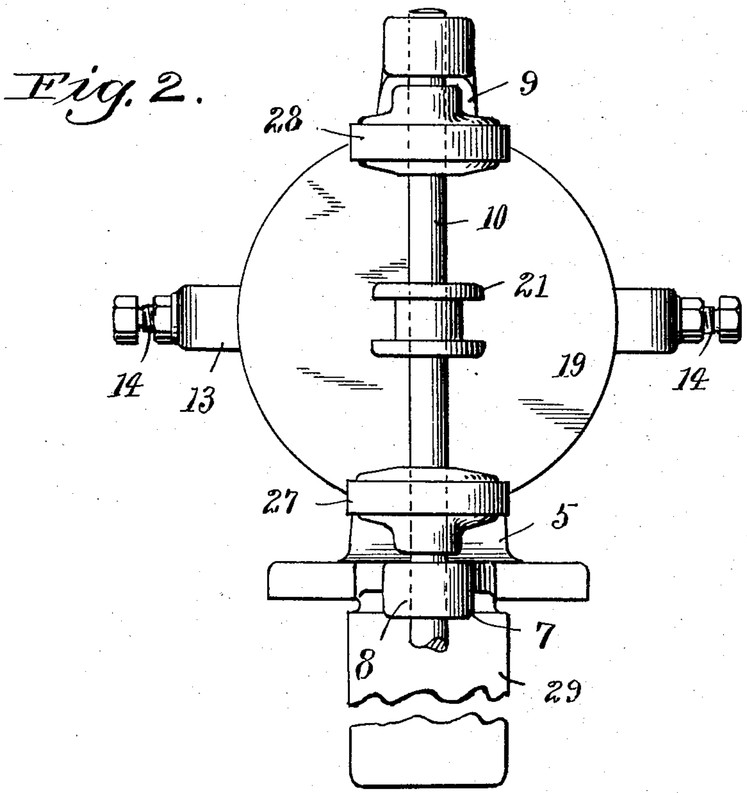
Figure 3:
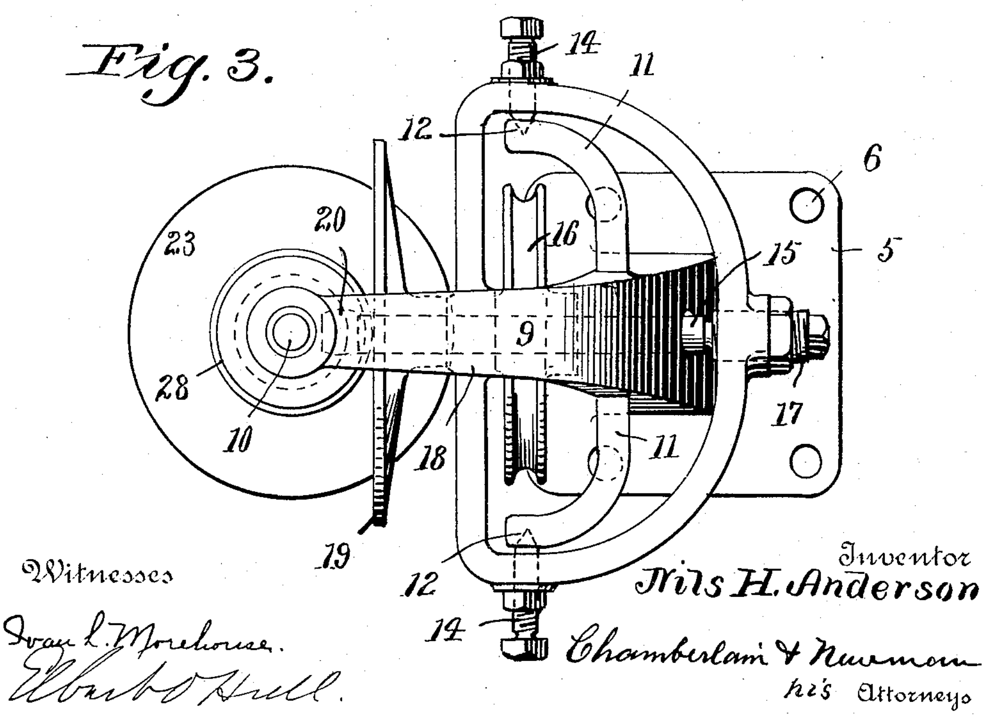

Figure 1 is a side elevation of my improved form of tapping machine complete, the spindle and chuck being shown in a raised position. Fig. 2 shows a front elevation, on a slightly reduced scale, of the upper portion of the machine shown in Fig. 1, the chuck and work table being omitted, and Fig. 3 shows a plan view of the machine as shown in Fig. 1, but drawn upon the same scale as Fig. 2.

Referring in detail to the characters of reference marked upon the drawings 5 represents the main frame of the machine, and which as will be noted includes a base that is provided with holes 6 to permit of its attachment to a bench or table. This base further includes an extension 7 that forms a support for the spindle bearing 8. The arm 9 that extends upward from the base also serves as a bearing for the upper end of the spindle 10. This arm 9 is further provided with extensions 11—11, that project out from its opposite sides to form supports and includes sockets 12 that support a yoke 13 the said yoke being pivotally connected with the supports by means of pointed and alined screws 14 that are secured in the before mentioned yoke and engage the sockets 12 before mentioned. This yoke is of a loop like shape and serves to carry the driving shaft 15 upon which the belt pulley 16 is secured and through which the machine is driven. The outer end portion of this driving shaft is journaled in a bearing 17 carried by the bowed portion of the yoke 13, while the inner end portion of the shaft is journaled at 18 in the straight portion of the yoke. A friction disk 19 is secured to the inner end portion of the driving shaft as is clearly shown in Fig. 1 and upon its extreme inner end is mounted a friction roll 20 to engage the groove of the collar 21 upon the spindle. A spring 22 is connected intermediate of the base and the outer portion of the yoke to counterbalance the weight of the yoke, shaft and disk in a manner to normally retain the disk in a neutral position. As will be noted the belt pulley is mounted upon the driving shaft in line with the pivotal axis of the yoke so as to leave the yoke free to be tilted.

The spindle 10 which has been referred to as being journaled in the arms 7 and 9 is designed to operate in a vertical plane and in alinement with the work table 23 arranged beneath it. A suitable chuck 24 is carried upon the lower end of the spindle and serves to support the tap 25 which operates upon the nut or work 26 supported upon the table.

A friction wheel 27 is mounted upon the lower end portion of the shaft and serves to be engaged by the side face of the disk 19 in a manner to drive the spindle and its tap in a forward direction. A second friction 28 is also mounted upon the upper end portion of the spindle in a way to be also engaged by the face of the disk 19 and to be driven thereby in an opposite direction from the lower direction. These frictions may be adjusted upon the spindle to and from the axis of the driving shaft to produce different speeds for the spindle as may be required.

As will be seen the collar 21 as well as the two frictions 27 and 28 are secured to the spindle and not only rotate but move together longitudinally. It will also be apparent that the longitudinal movement of the spindle and collar effects the driving shaft and tilts the disk so that but one of the frictions can be engaged with the disk at the same moment. The face of this disk may be shifted so as to engage either of the frictions or brought directly parallel to the spindle in a way to form a neutral or unengaged position.

To the base of the frame is secured a bracket 29 which is provided with arms 30—30 that extend out beneath the spindle and are provided with holes to accommodate the round shank 31 of the work carrying table 23. The adjustable collar 32 upon the shank of the table serves to engage the upper arm 30 of the bracket 29 and thus limit the upward movement of the work table.

In the operation of my novel form of tapping machine the operator would place the work, as for instance a nut 26, under the holder 33 and upon the table. Any suitable form of clamp or holder may be employed on the table to support the work. This insures the alinement of the work with and beneath the tap carried by the chuck. The table together with the work would then be raised and the latter brought into engagement with the end of the tap. Further pressure of the work against the tap would raise the spindle to the position indicated in Fig. 1 thereby shifting the angle of the driving shaft and tilting the face of the disk so that the latter would be brought up snugly against the lower friction 27. This insures the driving of the spindle in a forward direction and likewise its tap down into the work in a manner to tap the same. The moment this is accomplished and it is desirable to remove the work the operator presses down upon the table thus drawing the nut, tap and spindle down again shifting the driving shaft and tilting the disk against the upper friction 28 thereby driving the spindle in an opposite direction from what it had previously been driven thereby quickly running the tap out of the nut and freeing the latter.

From the foregoing it will be seen that the device is automatic in its action and that no shifting of levers, belts or clutches are required. The operator simply presses the work against the cutting tool to effect the threading in the first instance and then draws the work away when completed which act tends to reverse the rotation of the spindle and runs the tap out of the work.

Having thus described my invention what I claim and desire to secure by Letters Patent is:—

1. In a tapping machine, the combination of a frame, a work table, a yoke mounted upon the frame, a driving shaft carried in the yoke, a disk carried by the driving shaft, a longitudinally movable spindle carried in the frame, a pair of friction members mounted on the spindle to engage the face of the disk connection between the spindle and shaft to cause the engagement and disengagement of the said disk and friction member.

2. In a tapping machine, the combination of a frame, a work table, a yoke pivotedly mounted upon the frame, a driving shaft carried in the yoke, a disk carried by the driving shaft, a longitudinally movable spindle carried in the frame, a pair of friction members mounted on the spindle one to engage the disk above its axis and the other to engage the disk below its axis connection between the spindle and shaft to cause the engagement and disengagement of the said disk and friction member.

3. In a tapping machine, the combination of a frame, a longitudinally movable spindle carried in the frame, a yoke pivotedly shaft pivotally mounted in the frame and engaging the spindle in a manner to be tilted thereby, a disk mounted on the shaft, a pair of friction members mounted on the spindle to engage the face of the disk.

4. In a tapping machine, the combination of a frame, a longitudinally movable spindle carried in the frame, a yoke pivotedly mounted upon the frame, a driving shaft carried in the yoke, and means to engage the spindle to rock the shaft, a disk carried by the driving shaft, a pair of friction members mounted on the spindle, one to engage the disk above its axis and the other to engage the disk below its axis.

5. In a tapping machine, the combination of a frame, a longitudinally movable spindle carried in the frame, a pivotally mounted driving shaft arranged at a right angle to the spindle, means to engage the spindle to rock the shaft, a disk carried by the shaft, a pair of friction members mounted on the spindle to engage the face of the disk by the tilting of the shaft.

6. In a tapping machine, the combination of a frame, a pivotally mounted driving shaft, a disk carried by the driving shaft, a longitudinally movable spindle arranged at a right angle to the driving shaft and connected therewith to tilt the same, a pair of friction members mounted on the spindle to engage the disk above and below said connection of spindle and shaft.

7. In a tapping machine, the combination of a frame, a pivotally mounted driving shaft, a longitudinally movable spindle operatively connected to the said driving shaft to tilt the latter, driving connections between the shaft and spindle that are made effective by the tilting of the shaft, a movable work table mounted in the frame to effect the longitudinal movement of the spindle.

8. In a tapping machine, the combination of a frame, a work table, a longitudinally movable tool carrying spindle, a work table in alinement with the spindle and movable to and from the same, a driving shaft operatably connected with the spindle, a disk carried by the driving shaft, a pair of friction members mounted on the spindle to engage the face of the disk by the longitudinal movement of the table and spindle.

9. In a tapping machine, the combination of a frame, a yoke pivotedly mounted upon the frame, a driving shaft carried in the yoke, a driving pulley mounted upon the shaft between and in alinement with the pivotal supports of the yoke, a disk carried by the driving shaft, a longitudinally movable spindle carried in the frame, a pair of friction members mounted on the spindle to engage the disk.

10. In a tapping machine, the combination of a frame, a longitudinally movable spindle carried in the frame, a sleeve upon the spindle, a rotary driving shaft pivotally mounted in the frame and engaging the sleeve of the spindle, a pair of friction members mounted on the spindle to engage the disk, and means to move the spindle longitudinally to tilt the shaft and engage the friction members.

11. The combination of a frame, a spindle, a pivotally mounted driving shaft, a driven member mounted on said shaft, a pair of friction members mounted on said spindle, operative connection between said shaft and said spindle to effect alternate driving connection between said driven member and either of the friction members to effect a rotation of the spindle in either direction.

12. In a tapping machine, the combination of a frame, a longitudinally movable spindle carried in the frame, a driving shaft, a disk carried by the driving shaft, a pair of friction members mounted on the spindle and adapted to be adjusted to and from the axis of the disk, one to engage the disk above its axis and the other to engage the disk below its axis, and means to effect the engagement of either of said friction members within the disk by a longitudinal movement of the spindle.

13. In a tapping machine, the combination of a frame, a tool carrying spindle, a tiltable driving shaft, a disk carried by the driving shaft, a pair of friction members mounted on the spindle, means to cause the disk to engage either of the friction members by the operation of the spindle in a forward and backward direction.

14. In a tapping machine, the combination of a frame, a tool carrying spindle, a tiltable driving shaft, a disk carried by the driving shaft, a pair of friction members mounted on the spindle, means to normally retain the disk out of engagement with the said friction members, connections with the spindle to cause the disk to engage either of the friction members and to operate the spindle in a forward and backward direction.

Signed at Bridgeport, in the county of Fairfield and State of Connecticut this 27th day of May, A. D., 1915.

NILS H. ANDERSON.

Witnesses:
C. M. Newman,
Ruth M. W. Koger.

Copies of this patent may be obtained for five cents each, by addressing the "Commissioner of Patents, Washington, D. C."